Sept. 10, 1929.  E. P. HARLEY  1,727,768
FLY SWATTER
Filed Nov. 8, 1926
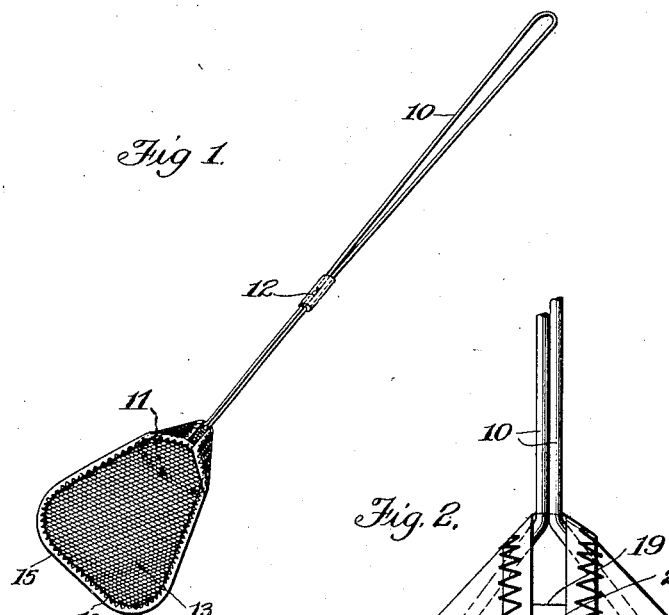
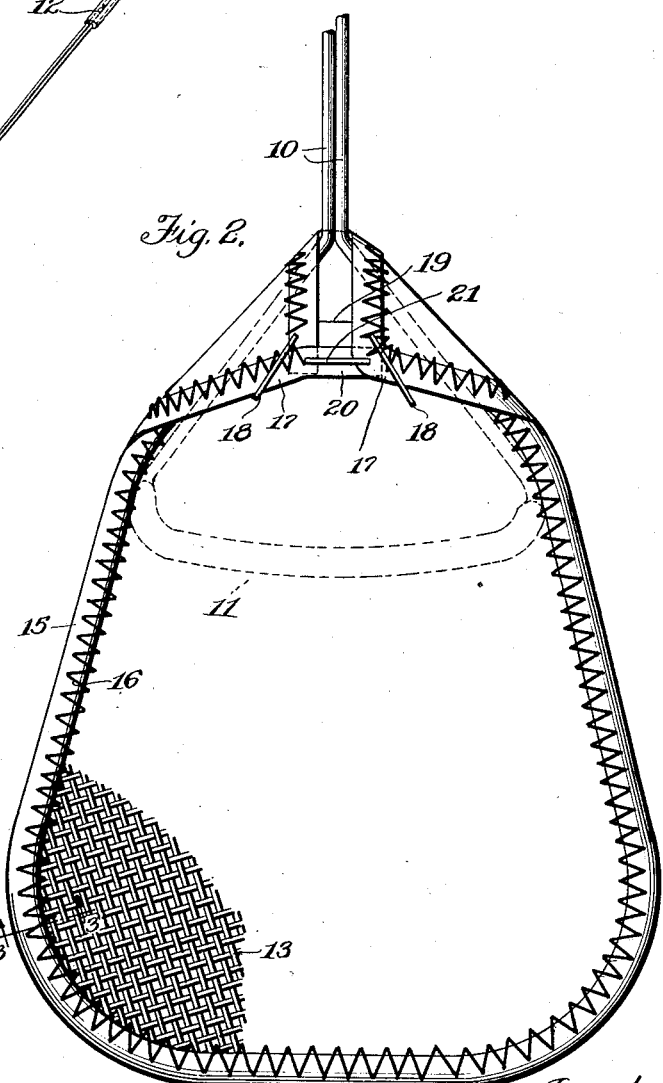
Inventor
Erskine P. Harley
By Nissen & Crane Attys.

Patented Sept. 10, 1929.

1,727,768

UNITED STATES PATENT OFFICE.

ERSKINE P. HARLEY, OF OKLAHOMA CITY, OKLAHOMA.

FLY SWATTER.

Application filed November 8, 1926. Serial No. 146,867.

This invention relates to an implement for destroying flies or other insects and has for its object the provision of a device of the class named which will permit the implement to pass through the air without creating excess air currents, which will be effective in destroying the fly when struck and which will not catch or adhere to objects struck by the implement.

A further object is to provide a fly swatter which shall be economical to manufacture, durable in use, and of improved construction and operation.

The invention is exemplified in the combination and arrangement of parts shown in the accompanying drawings and described in the following specification, and it is more particularly pointed out in the appended claims.

In the drawing:

Fig. 1 is a perspective view of a fly swatter embodying one form of the present invention;

Fig. 2 is a side elevation on a larger scale than Fig. 1, showing the flexible flap or striking portion of the swatter;

Fig. 3 is a section on line 3—3 of Fig. 2.

The swatter includes a handle portion 10 made of small rods or wire having a loop 11 at one end thereof and a reinforcing sleeve 12 between the ends of the handle. The flap or striking portion of the swatter is made up of two layers of netting 13 arranged face to face and having their edges bound by a strip of fabric 15 folded about the edges of the netting as shown in Fig. 3, and stitched to the netting by threads 16. The wire loop 11 is interposed between the layers of netting and the handle portion 10 projects from between the layers at one end of the flap. The corners of the flap 17 are folded over the sides of the loop 11 and secured in place about the sides of the loop by staples 18 extending through the corners of the flap and through the double thickness of netting. One layer of netting, over which the corners 17 are folded, is discontinued at 19 to provide an opening through which the wires 10 project to form the handle.

The binding material for the edge of the striker is continued at 20 across the gap between the overlapped corners and a staple 21 passes through the extremities of the corners and also bridges the gap between them, the staple passing through the double layer of netting. In this way, the flap or striker is firmly secured to the handle 10 and is reinforced by the loop 11.

The strands of which the netting 13 is composed are made of fibre and may be strands of twisted paper or other suitable fibrous material. Fibrous strands, unlike the strands of wire netting, are not sharp and stiff at the ends and will not penetrate the binding material so as to provide projecting ends which are liable to catch on cloth or other material struck by the swatter. The fibre also bends more readily than wire netting so that the strands do not break readily. By using the double layer of netting and binding the edges, a sufficient degree of stiffness is imparted to the striker to hold it in extended position. A swatter thus made has been found in practice to be convenient and efficient, stands up much longer under hard use than a wire netting swatter and has the other great advantage that it will not catch upon cloth or other material struck by the swatter and will not mar polished surfaces. The reinforcing loop being included between the two layers of netting prevents the loop from contacting with the surface struck, irrespective of the side of the swatter which engages the surface. The portion of this loop extending across the striking flap is flattened to make it wider and thinner so that it will not cut or wear the strands of the webbing.

I claim:—

1. A fly swatter comprising a striking flap made of openwork netting of fibrous material, the strands of which are twisted paper.

2. A fly swatter comprising a striking flap having two layers of fiber netting placed face to face, and a handle member having a reinforcing loop disposed between said layers, said reinforcing loop including a transverse flattened bar with its flat sides engaging the inner sides of said layers of netting.

3. A fly swatter comprising two layers of fibre netting with the marginal edges thereof bound by a fabric binding and with two of the corners thereof folded over and stapled down to confine a looped attaching end of a handle therebetween, said looped attaching end of the handle extending beyond the folds which confine it between the layers of the netting and the end piece of the loop being flattened substantially as and for the purpose described.

4. A fly swatter comprising a striking flap made of open-work netting woven from strands of twisted paper, both the woof and the warp strands being spaced apart to permit free passage of air transversely through said flap.

In testimony whereof I have signed my name to this specification on this 3rd day of November, A. D. 1926.

ERSKINE P. HARLEY.